(12) United States Patent
Ueyama (10) Patent No.: US 12,163,910 B2
(45) Date of Patent: Dec. 10, 2024

(54) GAS DETECTION DEVICE

(71) Applicant: KYOCERA Corporation, Kyoto (JP)

(72) Inventor: Daisuke Ueyama, Nara (JP)

(73) Assignee: KYOCERA Corporation, Kyoto (JP)

( * ) Notice: Subject to any disclaimer, the term of this patent is extended or adjusted under 35 U.S.C. 154(b) by 326 days.

(21) Appl. No.: 17/620,632

(22) PCT Filed: Jun. 19, 2020

(86) PCT No.: PCT/JP2020/024209
§ 371 (c)(1),
(2) Date: Dec. 17, 2021

(87) PCT Pub. No.: WO2020/262252
PCT Pub. Date: Dec. 30, 2020

(65) Prior Publication Data
US 2022/0244204 A1   Aug. 4, 2022

(30) Foreign Application Priority Data

Jun. 28, 2019 (JP) ................................ 2019-122008

(51) Int. Cl.
*G01N 27/12* (2006.01)
*G01N 27/14* (2006.01)
*G08B 17/117* (2006.01)

(52) U.S. Cl.
CPC ......... *G01N 27/124* (2013.01); *G08B 17/117* (2013.01); *G01N 27/14* (2013.01)

(58) Field of Classification Search
CPC ..... G01N 27/124; G01N 27/14; G08B 17/117
See application file for complete search history.

(56) References Cited

U.S. PATENT DOCUMENTS

| | | | | |
|---|---|---|---|---|
| 3,415,108 A | * | 12/1968 | Hubner | .................. G01N 27/16 |
| | | | | 73/31.05 |
| 4,703,646 A | * | 11/1987 | Muller | ............... G01N 33/0031 |
| | | | | 73/31.06 |
| 2017/0089875 A1 | | 3/2017 | Hasegawa et al. | |
| 2019/0265183 A1 | * | 8/2019 | Brown | ................. G01N 27/125 |

FOREIGN PATENT DOCUMENTS

| | | |
|---|---|---|
| JP | 2004-37180 A | 2/2004 |
| JP | 2011-53049 A | 3/2011 |
| JP | 2017-67538 A | 4/2017 |
| JP | 2018-9814 A | 1/2018 |
| JP | 2018009814 A * | 1/2018 |

* cited by examiner

*Primary Examiner* — Peter J Macchiarolo
*Assistant Examiner* — John M Royston
(74) *Attorney, Agent, or Firm* — Procopio, Cory, Hargreaves & Savitch LLP (57) ABSTRACT

A gas detection device includes a flow path in which a gas flows in a predetermined direction, at least one first-type gas sensor that includes a heater for heating the gas, and at least one second-type gas sensor that does not include a heater for heating the gas. The first-type gas sensor is positioned upstream of the second-type gas sensor in the flow path.

14 Claims, 9 Drawing Sheets

GAS DETECTION DEVICE

CROSS-REFERENCES TO RELATED APPLICATIONS

The present application claims priority of Japanese Patent Application No. 2019-122008, filed on Jun. 28, 2019, the entire contents of which are incorporated herein by reference.

TECHNICAL FIELD

The present disclosure relates to a gas detection device.

BACKGROUND ART

A sensor such as an odor sensor that can detect an odor or a gas concentration sensor that detects the concentration of a gas is known. Such a sensor may need to have the function of a heater. For example, a semiconductor gas sensor detects the concentration of a gas by detecting a change in electroconductivity as a change in resistance value. The change in electroconductivity occurs due to absorption and desorption of oxygen between a sample gas and oxygen absorbed by a gas-sensitive film activated by being heated by a heater.

A configuration in which a gas sensor is used together with a heater is also known. For example, PTL 1 discloses providing a sensor-heating heater on the upstream side of a gas sensor. For example, PTL 2 discloses a gas sensor that detects gas concentration from a change in resistance value of a gas-sensitive film heated by a heater.

CITATION LIST

Patent Literature

[PTL 1] Japanese Unexamined Patent Application Publication No. 2017-67538
[PTL 1] Japanese Unexamined Patent Application Publication No. 2004-37180

SUMMARY OF INVENTION

A gas detection device according to an embodiment includes a flow path in which a gas flows in a predetermined direction, at least one first-type gas sensor that includes a heater for heating the gas, and at least one second-type gas sensor that does not include a heater for heating the gas. The first-type gas sensor is positioned upstream of the second-type gas sensor in the flow path.

DESCRIPTION OF EMBODIMENTS

The function of a gas detection device in detecting a gas can be improved by stabilizing the temperature of the gas in an environment in which the gas is to be detected. An object of the present disclosure is to provide a gas detection device that can improve the function of detecting a gas. With an embodiment, it is possible to provide a gas detection device that can improve the function of detecting a gas.

In the present disclosure, the term "gas detection device" may refer to a device that detects a gas that flows in a flow path. In the present disclosure, the phrase "detects a gas" may refer to detection of, for example, the type of a gas and/or the concentration of a gas. In the present disclosure, the phrase "detects a gas" may refer to detection of, for example, the presence/absence of a specific gas, a specific odor (smell) or scent of a gas, or the presence/absence or the content of a specific component of a gas. In the present disclosure, the term "gas detection device" may refer to a device that detects a gas by using a gas sensor that is electrically driven. In the present disclosure, the term "gas sensor" may refer to any of various gas sensors described below. Hereafter, a gas detection device according to an embodiment will be described with reference to the drawings. For convenience of description, an XYZ orthogonal coordinate system is added to each of the drawings.

Figure 1:
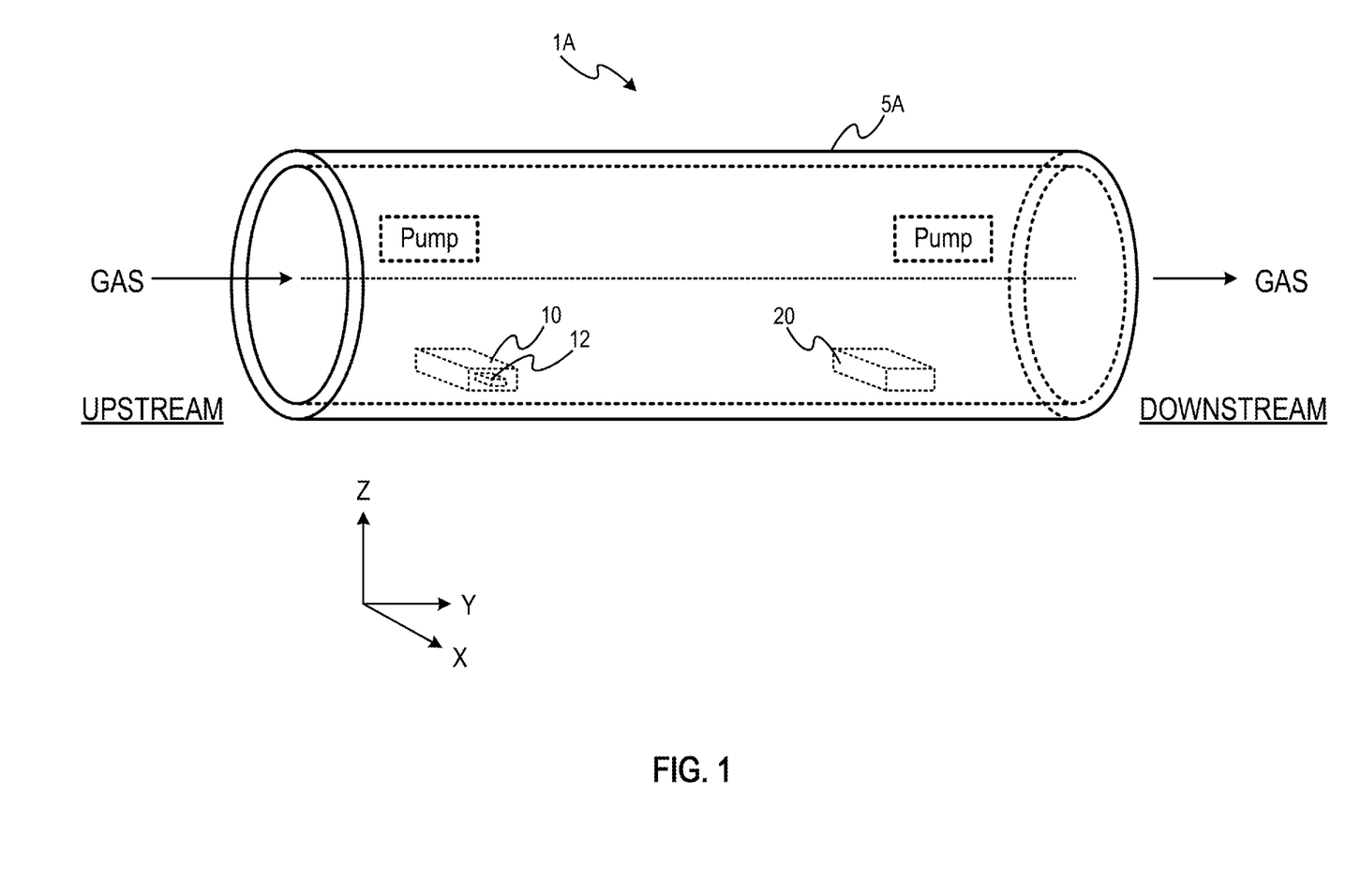
FIG. 1 is a schematic view illustrating a configuration of a gas detection device according to an embodiment.

FIG. 1 illustrates an example of a simple configuration of a gas detection device according to an embodiment.

As illustrated in FIG. 1, a gas detection device 1A according to an embodiment includes, for example, a flow path formed by a tubular member 5A, a gas sensor 10, and a gas sensor 20. Hereafter, the flow path formed by the tubular member 5A may be simply referred to as "flow path 5A".

The gas detection device 1A illustrated in FIG. 1 has a gas inlet on the left side and has a gas outlet on the right side. That is, the gas detection device 1A illustrated in FIG. 1 detects a gas that flows in the flow path 5A from the inlet toward the outlet (in the positive direction of the Y-axis shown in the figure). In this way, the gas detection device 1 according to an embodiment includes the flow path 5A in which a gas flows in a predetermined direction.

As illustrated in FIG. 1, when a gas flows in the flow path 5A in a predetermined direction (for example, the positive direction of the Y-axis), a side near the gas inlet will be referred to as "upstream" and a side near the gas outlet will be referred to as "downstream". The "upstream" and "downstream" are relative concepts. That is, in the flow path 5A, with respect to a certain position, a side nearer than the position to the gas inlet may be referred to as "upstream". In the flow path 5A, with respect to a certain position, a side nearer than the position to the gas outlet may be referred to as "downstream".

In an embodiment, an upstream portion including the vicinity of the inlet of the gas detection device 1A and/or a downstream portion including the vicinity of the outlet of the gas detection device 1A may have any appropriate configuration in accordance with uses and/or specifications required. For example, a pump that forces a gas into the inlet may be provided in the upstream portion including the vicinity of the inlet of the gas detection device 1A. Any pump may be used as the pump, as long as the pump can force a gas into the inlet. Likewise, for example, a pump that forces a gas out of the outlet may be provided in the downstream portion including the vicinity of the outlet of the gas detection device 1A. Any pump may be used as the pump, as long as the pump can force a gas out of the outlet. In an embodiment, the gas detection device 1A may include both of a pump for forcing a gas into the inlet and a pump for forcing a gas out of the outlet. In an embodiment, the gas detection device 1A may include only one of a pump for forcing a gas into the inlet and a pump for forcing a gas out of the outlet. The pump may be any appropriate pump such as a diaphragm pump. In FIG. 1, illustration of such a pump is omitted.

The tubular member 5A that forms the flow path 5A may be, for example, a tubular member having a flow path in which a gas flows in a predetermined direction. The tubular member 5A may be made of any appropriate material. For example, the tubular member 5A may be made of any of the following materials: a metal such as aluminum, copper, or titanium; ceramics; glass; a resin such as a fluorocarbon resin or a silicone resin; a glass epoxy resin; or the like. As described below, the gas detection device 1A includes gas sensors, and at least one of the gas sensors includes at least one heater. Accordingly, the tubular member 5A that forms the flow path 5A may be made of a material that does not deform even when a gas that has flowed into the flow path 5A is heated by the heater.

In FIG. 1, the flow path 5A has a tubular shape whose cross-sectional shape perpendicular to the Y-axis is a circular shape. In this way, the flow path 5A of the gas detection device 1A according to an embodiment may have a tubular shape. However, the cross-sectional shape of the flow path 5A perpendicular to the Y-axis is not limited to a circular shape. In an embodiment, the cross-sectional shape of the flow path 5A perpendicular to the Y-axis may be, for example, an elliptical shape. In an embodiment, the cross-sectional shape of the flow path 5A perpendicular to the Y-axis may be a polygonal shape, such as a triangular shape, a quadrangular shape, a pentagonal shape, a hexagonal shape, or an octagonal shape.

In FIG. 1, the flow path 5A extends linearly in the Y-axis direction. However, the shape of the flow path 5A is not limited to a shape extending linearly in the Y-axis direction. In an embodiment, the flow path 5A may have a bent shape or may extend in a curvilinear shape. The flow path 5A may have any appropriate shape in accordance with, for example, a manner in which the gas detection device 1A is installed, and/or specifications and the like required by the gas detection device 1A to detect a gas.

As illustrated in FIG. 1, in the gas detection device 1A according to an embodiment, the gas sensor 10 and the gas sensor 20 are attached to the inside of the flow path 5A. In an embodiment, as illustrated in FIG. 1, the gas sensor 10 is disposed on the upstream side of the gas sensor 20. That is, in an embodiment, as illustrated in FIG. 1, the gas sensor 20 is disposed on the downstream side of the gas sensor 10.

The gas sensor 10 and the gas sensor 20 may be, for example, attached to the inner wall of the flow path 5A. The gas sensor 10 and the gas sensor 20 may be attached to the inner wall of the flow path 5A by, for example, using an adhesive or welding. The gas sensor 10 and the gas sensor 20 may be attached to the inner wall of the flow path 5A by, for example, using a screw. The gas sensor 10 and the gas sensor 20 may be attached to the inner wall of the flow path 5A by, for example, providing members that allow the gas sensors 10 and 20 to be fitted thereto on the inner wall of the flow path 5A. Electricity may be supplied to the gas sensor 10 and the gas sensor 20 from, for example, the outside of the tubular member 5A. In FIG. 1, illustrations of a member, wiring, and the like for supplying electricity to the gas sensor 10 and the gas sensor 20 are omitted.

As illustrated in FIG. 1, the gas sensor 10 includes a heater 12. The heater 12 may be a heater for heating a gas. In an embodiment, the heater 12 may heat a gas to be detected by the gas sensor 10. Hereafter, "heater for heating a gas" will be simply referred to as "heater". Any heater may be used as the heater 12, as long as the heater can heat a gas to be detected by the gas sensor 10. For example, the heater 12 may heat a gas that is present in and around the gas sensor 10 to a temperature that is necessary for the gas detection device 1A to detect the gas. The heater 12 may have a function of heating a gas to, for example, a temperature in a range of about 30° C. to 350° C. as a temperature that is necessary for the gas detection device 1A to detect the gas. Any appropriate existing heating mechanism may be used as a heating mechanism of the heater 12.

The heater 12 may be incorporated in the gas sensor 10, may be attached to an outer part of the gas sensor 10, or may be attached to the vicinity of the gas sensor 10. The gas sensor 10 may be, for example, a semiconductor sensor, a catalytic combustion sensor, or the like. Electricity may be supplied to the heater 12 from, for example, the gas sensor 10. Electricity may be supplied to the heater 12 from, for example, the outside of the tubular member 5A. In FIG. 1, illustration of members, wiring, and the like for supplying electricity to the heater 12 is omitted.

In this way, the gas sensor 10 may include at least one heater 12 for heating a gas. In the present disclosure, a gas sensor including the heater 12 for heating a gas, such as the gas sensor 10, will be referred to as "first-type gas sensor".

As illustrated in FIG. 1, the gas sensor 20 does not include the heater 12. In an embodiment, the gas sensor 20 may be a sensor that does not include a heater for heating a gas to be detected by the gas sensor 10. The gas sensor 20 may be a gas sensor of a type that is affected by temperature, such as the gas temperature or the ambient temperature. The gas sensor 20 may be for example, an electrochemical sensor, a relative humidity sensor (capacitance-type sensor), or the like. The gas sensor 20 may be, for example, the semiconductor sensor, the catalytic combustion sensor, or the like that has been described above and that does not include a heater for heating a gas.

In this way, the gas sensor 20 need not include a heater (such as the heater 12) for heating a gas. The gas sensor 20 may include a gas sensor that is affected by temperature. In the present disclosure, a gas sensor that does not include a heater for heating a gas, such as the gas sensor 20, will be referred to as "second-type gas sensor". The second-type gas sensor may include a gas sensor that is affected by temperature.

As illustrated in FIG. 1, the gas sensor 10 and the gas sensor 20 may be disposed substantially parallel to the direction in which a gas flows in the flow path 5A. In FIG. 1, the gas sensor 10 and the gas sensor 20 are aligned along a straight line extending parallel to the Y-axis in the direction in which a gas flows in the flow path 5A. In this way, in an embodiment, the gas sensor 10 and the gas sensor 20 may be disposed on the inside of the tubular member 5A that forms the flow path 5A on a base line (straight line) that is parallel to the central axis of the tubular member 5A. On the other hand, in another embodiment, the gas sensor 10 and the gas sensor 20 need not be disposed on a base line (straight line) that is parallel to the central axis of the tubular member 5A that forms the flow path 5A. If the tubular member 5A that forms the flow path 5A has a bent shape or a curvilinear shape, the gas sensor 10 and the gas sensor 20 may be disposed along the bend or the curved line on the inside of the tubular member 5A that forms the flow path 5A.

In this way, the gas detection device 1A according to an embodiment includes the flow path 5A, the first-type gas sensor 10, and the second-type gas sensor 20. In the flow path 5A of the gas detection device 1A according to an embodiment, the first-type gas sensor 10 is disposed upstream of the second-type gas sensor 20.

With the gas detection device 1A according to an embodiment, the heater 12 of the gas sensor 10, which is disposed on the upstream side in the flow path 5A, heats a gas to a certain temperature. Therefore, with the gas detection device 1A, the gas sensor 20, which is disposed on the downstream side, is unlikely to be affected by the temperature of an environment in which a gas is measured and/or the temperature of the gas. Accordingly, it can be expected that the gas sensor 20, which is disposed on the downstream side, can stabilize gas detection output (such as a voltage value). Moreover, with the gas detection device 1A according to an embodiment, it is possible to stably heat a gas because the gas sensor 10 including the heater 12 is disposed on the upstream side. Moreover, with the gas detection device 1A according to an embodiment, it is possible to efficiently increase the gas temperature on the upstream side of the flow path 5A. Therefore, it can be expected that the gas sensor 20 on the downstream side can improve stability in gas detection output (such as a voltage value).

Hereafter, some examples of other embodiments will be described. The linear arrangement of a plurality of gas sensors, such as the gas sensor 10 and the gas sensor 20 illustrated in FIG. 1, will be referred to as "sensor array". For example, a sensor array including the gas sensor 10 and the gas sensor 20 will be referred to as "sensor array (10, 20)". In an embodiment, as illustrated in FIG. 1, a sensor array such as the sensor array (10, 20) may be disposed on a base line (straight line) that is parallel to the central axis of the tubular member 5A on the inside (for example, the inner wall) of the tubular member 5A that forms the flow path 5A. As described below, in an embodiment, the sensor array (10, 20) may include at least two gas sensors 10 and at least two gas sensors 20.

Figure 2:
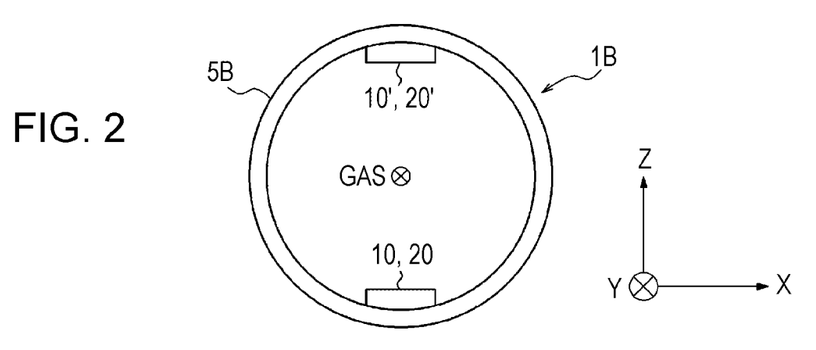
FIG. 2 is a schematic view illustrating a configuration of a gas detection device according to an embodiment.

FIG. 1 illustrates a state in which a gas flows from the left side to the right side (in the positive direction of the Y-axis) in the flow path 5A of the gas detection device 1A. FIG. 2 illustrates a state in which a gas flows from the front side to the back side (in the positive direction of the Y-axis) in a flow path 5B of a gas detection device 1B. That is, in the flow path 5B of the gas detection device 1B illustrated in FIG. 2, the front side may be upstream, and the back side may be the downstream.

In the gas detection device 1B illustrated in FIG. 2, the flow path 5B may be configured in a similar way to the flow path 5A illustrated in FIG. 1. The gas detection device 1B illustrated in FIG. 2 includes two sensor arrays each of which is similar to that illustrated in FIG. 1. That is, as with the gas detection device 1A illustrated in FIG. 1, the gas detection device 1B illustrated in FIG. 2 includes the sensor array (10, 20) on the negative side of the Z-axis on the inside of the tubular member 5B that forms the flow path 5B. The gas detection device 1B illustrated in FIG. 2 further includes a sensor array (10', 20'), which includes a gas sensor 10' and a gas sensor 20', on the positive side of the Z-axis on the inside of the tubular member 5B that forms the flow path 5B. As with the gas sensor 10, the gas sensor 10' may include the heater 12 for heating a gas. On the other hand, as with the gas sensor 20, the gas sensor 20' need not include a heater (such as the heater 12) for heating a gas.

In the sensor array (10, 20) of the gas detection device 1B illustrated in FIG. 2, the gas sensor 10 is disposed on the upstream side (the negative side of the Y-axis), and the gas sensor 20 is disposed on the downstream side (the positive side of the Y-axis). Likewise, in the sensor array (10', 20') of the gas detection device 1B illustrated in FIG. 2, the gas sensor 10' is disposed on the upstream side (the negative side of the Y-axis), and the gas sensor 20' is disposed on the downstream side (the positive side of the Y-axis).

The sensor arrays (10, 20) of the gas detection device 1B illustrated in FIG. 2 are arranged on the inside of the tubular member 5B at an interval of a center angle of 180°. However, in the gas detection device 1B, the interval of the center angle at which the sensor arrays (10, 20) are arranged is not limited to an angle of 180°. For example, the sensor arrays (10, 20) of the gas detection device 1B according to an embodiment may be disposed on the inside of the tubular member 5B so as to be arranged close to each other (for example, in two rows in the Y-axis direction).

In this way, the gas detection device 1B according to an embodiment includes a sensor array in which the first-type gas sensor 10 and the second-type gas sensor 20 are arranged in a row in the flow path 5B. Also in the flow path 5B of the gas detection device 1B according to an embodiment, the first-type gas sensor 10 is disposed upstream of the second-type gas sensor 20. Accordingly, also with the gas detection device 1B, it is possible to obtain advantageous effects similar to those of the gas detection device 1A.

Figure 3:
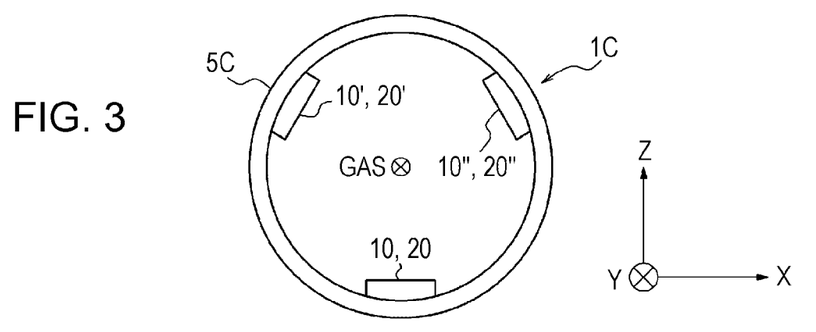
FIG. 3 is a schematic view illustrating a configuration of a gas detection device according to an embodiment.

FIG. 3 illustrates a modification of the gas detection device 1B illustrated in FIG. 2. The meanings of symbols in FIG. 3 are similar to those in FIG. 2.

The gas detection device 1B illustrated in FIG. 2 includes two sensor arrays. In contrast, a gas detection device 1C illustrated in FIG. 3 includes three sensor arrays.

As illustrated in FIG. 3, the gas detection device 1C includes, as a third sensor array, a sensor array (10", 20"), which includes a gas sensor 10" and a gas sensor 20", in a tubular member 5C that forms the flow path 5C. As with the gas sensor 10, the gas sensor 10" may include the heater 12 for heating a gas. On the other hand, as with the gas sensor 20, the gas sensor 20" need not include a heater (such as the heater 12) for heating a gas. In the sensor array (10", 20") of the gas detection device 1C illustrated in FIG. 3, the gas sensor 10" is disposed on the upstream side (the negative side of the Y-axis), and the gas sensor 20" is disposed on the downstream side (the positive side of the Y-axis).

The three sensor arrays of the gas detection device 1C illustrated in FIG. 3 are arranged on the inside of the tubular member 5C at an interval of a center angle of 60°. However, in the gas detection device 1C, the interval of the center angle at which the sensor arrays are arranged is not limited to an angle of 60°. In the gas detection device 1C, the sensor arrays may be arranged at an interval of any appropriate center angle.

In this way, also in the gas detection device 1C according to an embodiment, the first-type gas sensor 10 is disposed upstream of the second-type gas sensor 20.

Accordingly, also with the gas detection device 1C, it is possible to obtain advantageous effects similar to those of the gas detection device 1A and the gas detection device 1B.

The gas detection device 1C illustrated in FIG. 3 includes three sensor arrays, which are the sensor array (10, 20), the sensor array (10', 20'), and sensor array (10", 20"). However, the gas detection device 1 according to an embodiment may include more than three sensor arrays.

Figure 4:
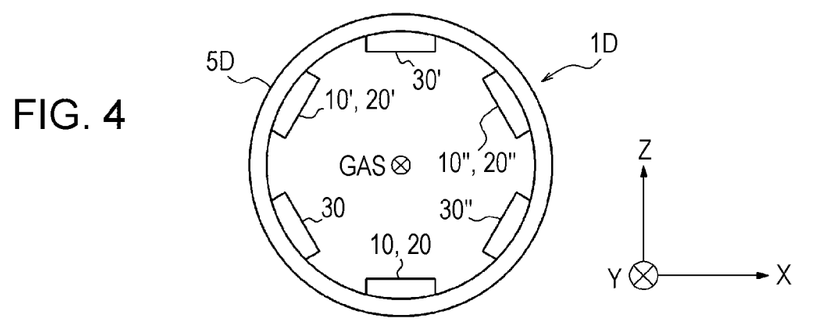
FIG. 4 is a schematic view illustrating a configuration of a gas detection device according to an embodiment.

FIG. 4 illustrates a modification of the gas detection device 1C illustrated in FIG. 3. The meanings of symbols in FIG. 4 are similar to those in FIG. 3.

A gas detection device 1D illustrated in FIG. 4 differs from the gas detection device 1C illustrated in FIG. 3 in that the gas detection device 1D includes three additional sensor arrays. As illustrated in FIG. 4, the gas detection device 1D may include a sensor array 30, for example, between the sensor array (10, 20) and the sensor array (10', 20'). The gas detection device 1D may include a sensor array 30', for example, between the sensor array (10', 20') and the sensor array (10", 20"). Moreover, the gas detection device 1D may include a sensor array 30", for example, between the sensor array (10", 20") and the sensor array (10, 20). Hereafter, at least one of the sensor array (10, 20), the sensor array (10', 20'), and sensor array (10", 20") will be simply referred to as "sensor array (10, 20) and the like". A least one of the sensor array 30, the sensor array 30', and the sensor array 30" will be simply referred to as "sensor array 30 and the like".

The aforementioned sensor array (10, 20) and the like each include a gas sensor (such as the gas sensor 10) that includes a heater for heating a gas and a gas sensor (such as the gas sensor 20) that does not include a heater for heating a gas. In contrast, the sensor array 30 and the like each may include a gas sensor that does not include a heater (such as the heater 12) for heating a gas. That is, in the sensor array 30 and the like, for example, even a gas sensor that is disposed at the position of the gas sensor 10 illustrated in FIG. 1 (that is, a position on the upstream side) need not include a heater for heating a gas. Even if a gas sensor disposed in the sensor array 30 and the like on the upstream side does not include a heater, the sensor array 30 and the like are disposed so as to be interposed between the sensor array (10, 20) and the like.

Accordingly, in the sensor array 30 and the like, for example, even when a gas sensor that does not include a heater is disposed at the position of the gas sensor 10 illustrated in FIG. 1, the gas sensor is disposed so as to be interposed between the gas sensors 10 each of which includes a heater. The sensor array 30 may include a gas sensor that is affected by temperature, such as the gas sensor 20.

The gas detection device 1D illustrated in FIG. 4 includes three sensor arrays 30 and the like. However, the number of the sensor arrays 30 included in the gas detection device 1D is not limited to three, and may be greater than or less than three.

In this way, the gas detection device 1D according to an embodiment may include a plurality of sensor arrays (10, 20) and the like. In this case, at least one gas sensor that does not include the heater 12 for heating a gas may be disposed between two of the plurality of the sensor arrays (10, 20) and the like. In the aforementioned case, at least one gas sensor that is affected by temperature may be disposed between two of the plurality of the sensor arrays (10, 20) and the like. Also in the gas detection device 1D according to an embodiment, the first-type gas sensor 10 is disposed upstream of the second-type gas sensor 20. Accordingly, also with the gas detection device 1D, it is possible to obtain advantageous effects similar to those of the gas detection device 1C and the like.

Figure 5:
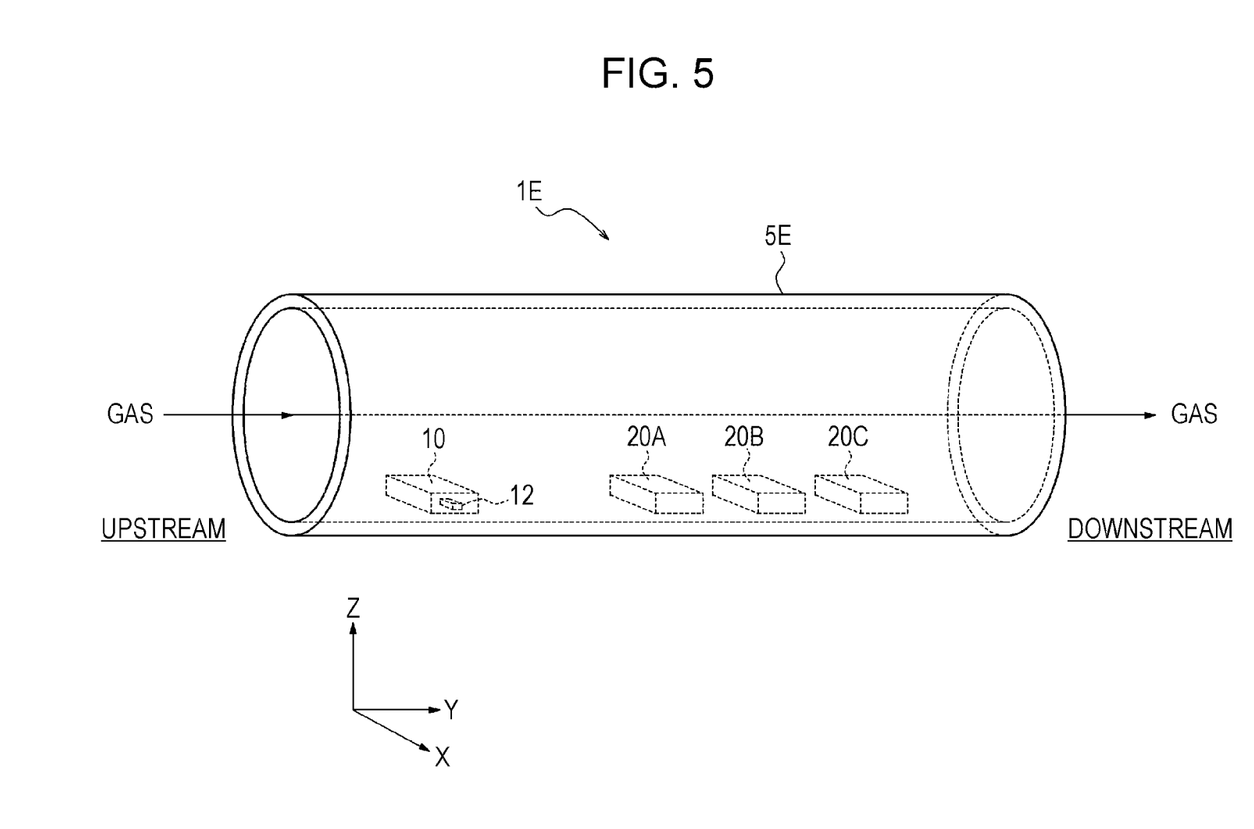
FIG. 5 is a schematic view illustrating a configuration of a gas detection device according to an embodiment.

FIG. 5 illustrates a modification of the gas detection device 1A illustrated in FIG. 1. The meanings of symbols in FIG. 5 are similar to those in FIG. 1.

A gas detection device 1E illustrated in FIG. 5 differs from the gas detection device 1A illustrated in FIG. 1 in that a plurality of gas sensors 20 are disposed in the gas detection device 1E. As illustrated in FIG. 5, three gas sensors, which are the gas sensor 20A, the gas sensor 20B, and the gas sensor 20C, are arranged in a row in the gas detection device 1E. However, any number of gas sensors 20 may be disposed in the gas detection device 1E.

Figure 6:
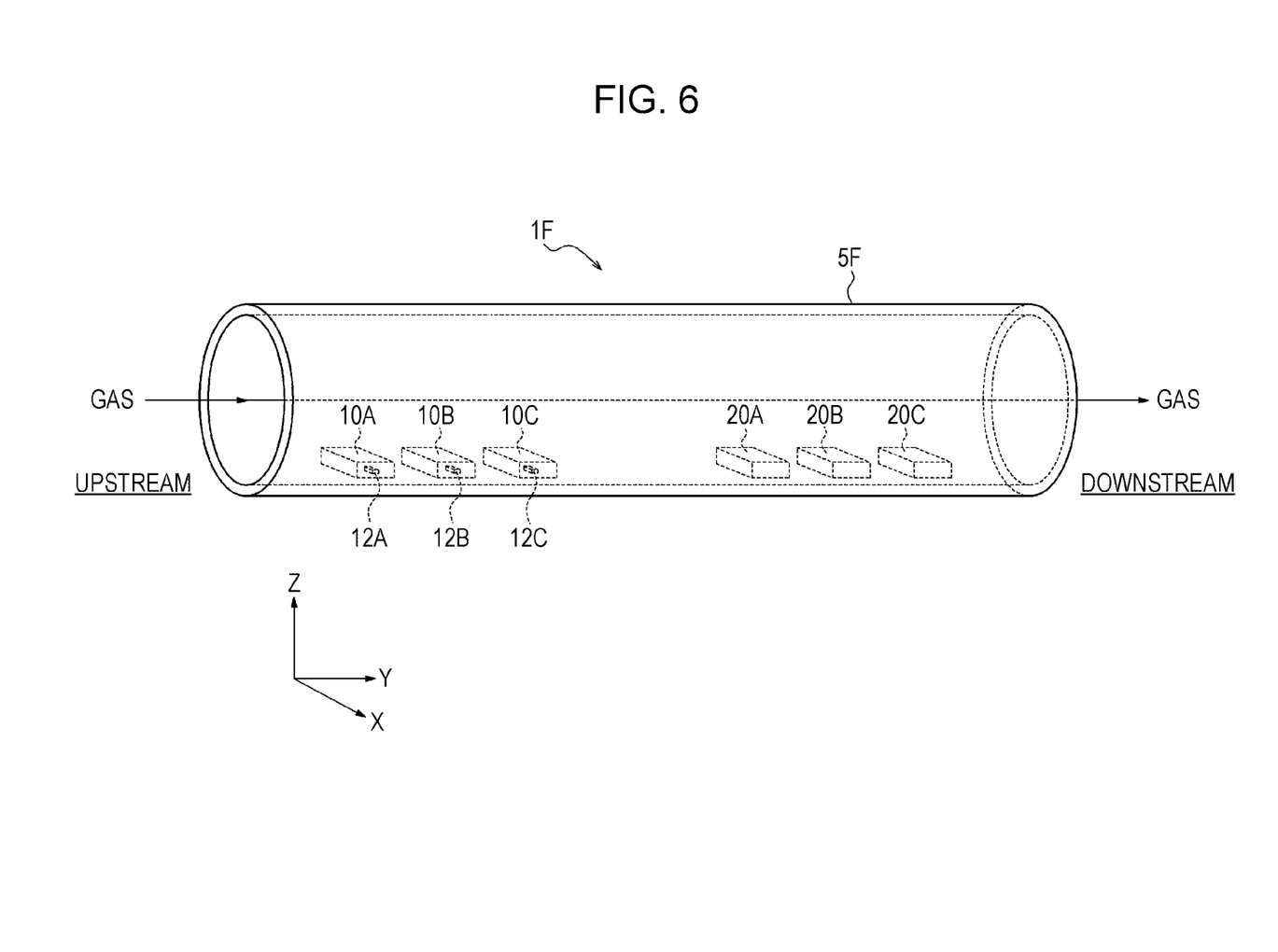
FIG. 6 is a schematic view illustrating a configuration of a gas detection device according to an embodiment.

FIG. 6 illustrates a modification of the gas detection device 1E illustrated in FIG. 5. The meanings of symbols in FIG. 6 are similar to those in FIG. 5.

A gas detection device 1F illustrated in FIG. 6 differs from the gas detection device 1E illustrated in FIG. 5 in that a plurality of gas sensors 10 are disposed in the gas detection device 1F. As illustrated in FIG. 6, in the gas detection device 1F, three gas sensors, which are a gas sensor 10A, a gas sensor 10B, and a gas sensor 10C, are arranged in a row. However, any number of gas sensors 10 may be disposed in the gas detection device 1F.

Moreover, the gas detection device 1F illustrated in FIG. 6 includes a plurality of gas sensors 20, as with the gas detection device 1E illustrated in FIG. 5. However, the gas detection device 1F illustrated in FIG. 6 may include only one gas sensor 20.

As in the gas detection device 1E illustrated in FIG. 5 and the gas detection device 1F illustrated in FIG. 6, at least one of the first-type gas sensor 10 and the second-type gas sensor 20 may include a plurality of gas sensors.

FIGS. 5 and 6 illustrate examples in each of which only one sensor array (10, 20), which includes the gas sensor 10 and the gas sensor 20, is disposed. However, as with the gas detection devices 1B to 1D illustrated in FIGS. 2 to 4, at least one of the gas detection device 1E and the gas detection device 1F may include at least two sensor arrays.

The three gas sensors 10 in the gas detection device 1F illustrated in FIG. 6 each include the heater 12. That is, the gas sensor 10A includes a heater 12A, the gas sensor 10B includes a heater 12B, and the gas sensor 10C includes a heater 12C. However, at least one of the heaters 12 may be omitted, for example, in a case where the gas sensor 10A, the gas sensor 10B, and the gas sensor 10C are disposed close to each other, such as in a case where the gas sensors 10A to 10C are disposed adjacent to each other. For example, in the case where the gas sensor 10A, the gas sensor 10B, and the gas sensor 10C are disposed adjacent to each other, only the gas sensor 10B may include the heater 12B. That is, in this case, the gas sensor 10A need not include the heater 12A, and the gas sensor 10C need not include the heater 12C.

In FIG. 6, the gas sensor 10A, the gas sensor 10B, and the gas sensor 10C are arranged parallel to the Y-axis. In such an arrangement, the plurality of gas sensors 10 may share the heater 12 as described above. On the other hand, for example, in a flow path 5F of the gas detection device 1F illustrated in FIG. 6, a plurality of gas sensors 10 may be arranged in a direction perpendicular to the Y-axis (for example, along the inner wall of the flow path 5F). In such an arrangement, the plurality of gas sensor 10 may share the heater 12 as described above.

As describe above, in the first-type gas sensor 10 of the gas detection device 1F according to an embodiment, one of the heaters 12 for heating a gas may be shared by a plurality of gas sensors. It is possible to reduce power consumption by sharing the heater 12 by the plurality of gas sensors 10 in this way.

Next, some examples of embodiments each having a configuration different from that of each of the embodiments described above will be described. Hereafter, descriptions that are the same as or similar to those of the embodiments described above will be simplified or omitted as appropriate.

Figure 7:
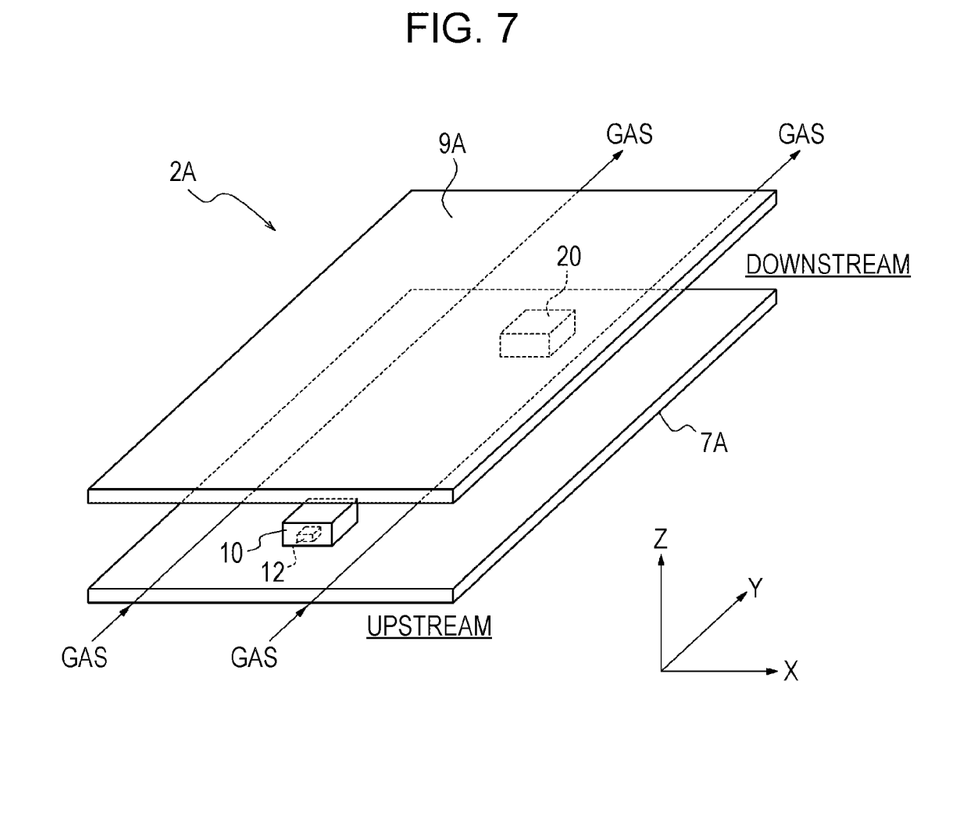
FIG. 7 is a schematic view illustrating a configuration of a gas detection device according to an embodiment.

FIG. 7 illustrates an example of a gas detection device having a configuration different from those of the embodiments described above.

As illustrated in FIG. 7, a gas detection device 2A according to an embodiment includes a flow path that is composed of plate-shaped members 7A and 9A, the gas sensor 10, and the gas sensor 20. Hereafter, the flow path that is composed of the plate-shaped members 7A and 9A will be simply referred to as "flow path (7A, 9A)".

As illustrated in FIG. 7, the gas detection device 2A has a gas inlet on the front side and has a gas outlet on the back side. That is, the gas detection device 2A illustrated in FIG. 7 detects a gas that flows in the flow path (7A, 9A) from the inlet toward the outlet (in the positive direction of the Y-axis shown in the figure). In FIG. 7, the left and right end portions of the flow path (7A, 9A) are open. However, the left and right end portions of the flow path (7A, 9A) may be closed.

The plate-shaped members 7A and 9A that form the flow path (7A, 9A) may be, for example, thin plate-shaped members that form a flow path in which a gas flows in a predetermined direction. The plate-shaped members 7A and 9A may be made of any appropriate material. For example, the plate-shaped members 7A and 9A each may be made of any of the following materials: a metal such as aluminum, copper, or titanium; ceramics; glass; a resin such as a fluorocarbon resin or a silicone resin; a general electric circuit board made of a glass-epoxy resin or the like; or the like. As with the embodiments described above, the gas detection device 2A also includes gas sensors, and at least one of the gas sensors includes a heater. Accordingly, the plate-shaped members 7A and 9A that form the flow path (7A, 9A) may be made of a material that does not deform even when a gas that has flowed into the flow path (7A, 9A) is heated by the heater. In this way, in the gas detection device 2A according to an embodiment, the flow path (7A, 9A) may be formed between two surfaces that face each other.

In FIG. 7, the plate-shaped members 7A and 9A are illustrated as two surfaces that are parallel to each other. However, the plate-shaped members 7A and 9A need not be parallel to each other.

In FIG. 7, the plate-shaped members 7A and 9A each extend in a planar shape. However, at least one of the plate-shaped members 7A and 9A is not limited to a member that extends in a planar shape. In an embodiment, at least one of the plate-shaped members 7A and 9A may have a bent shape or may extend in a curved-surface shape. At least one of the plate-shaped members 7A and 9A may have any appropriate shape in accordance with, for example, a manner in which the gas detection device 2A is installed and/or specifications and the like required by the gas detection device 2A to detect a gas.

As illustrated in FIG. 7, in the gas detection device 2A according to an embodiment, the gas sensor 10 and the gas sensor 20 are attached to the inside of the flow path (7A, 9A). In an embodiment, as illustrated in FIG. 7, the gas sensor 10 is disposed on the upstream side of the gas sensor 20. That is, in an embodiment, as illustrated in FIG. 7, the gas sensor 20 is disposed on the downstream side of the gas sensor 10.

As illustrated in FIG. 7, the gas sensor 10 includes the heater 12. The heater 12 may be a heater for heating a gas. In an embodiment, the gas sensor 10 may be a first-type gas sensor including the heater 12 for heating a gas.

As illustrated in FIG. 7, the gas sensor 20 does not include the heater 12. In an embodiment, the gas sensor 20 may be a second-type gas sensor that does not include a heater for heating a gas. The second-type gas sensor may include a gas sensor that is affected by temperature.

In this way, the gas detection device 2A according to an embodiment includes the flow path (7A, 9A), the first-type gas sensor 10, and the second-type gas sensor 20. In the flow path (7A, 9A) of the gas detection device 2A according to an embodiment, the first-type gas sensor 10 is disposed upstream of the second-type gas sensor 20. Accordingly, also with the gas detection device 2A, it is possible to obtain advantageous effects similar to those of the gas detection device 1A and the like.

FIG. 7 illustrates an example in which the upper surfaces of the gas sensor 10 and the gas sensor 20, which are disposed on the plate-shaped member 7A, are separated from the plate-shaped member 9A in the gas detection device 2A. However, in the gas detection device 2A according to an embodiment, the upper surfaces of the gas sensor 10 and the gas sensor 20, which are disposed on the plate-shaped member 7A, may be in contact with or, for example, bonded to the plate-shaped member 9A. Also in this case, a sufficiently wide gas flow path is formed, for example, on each of the right side and the left side of the gas sensor 10 and the gas sensor 20.

Figure 8:
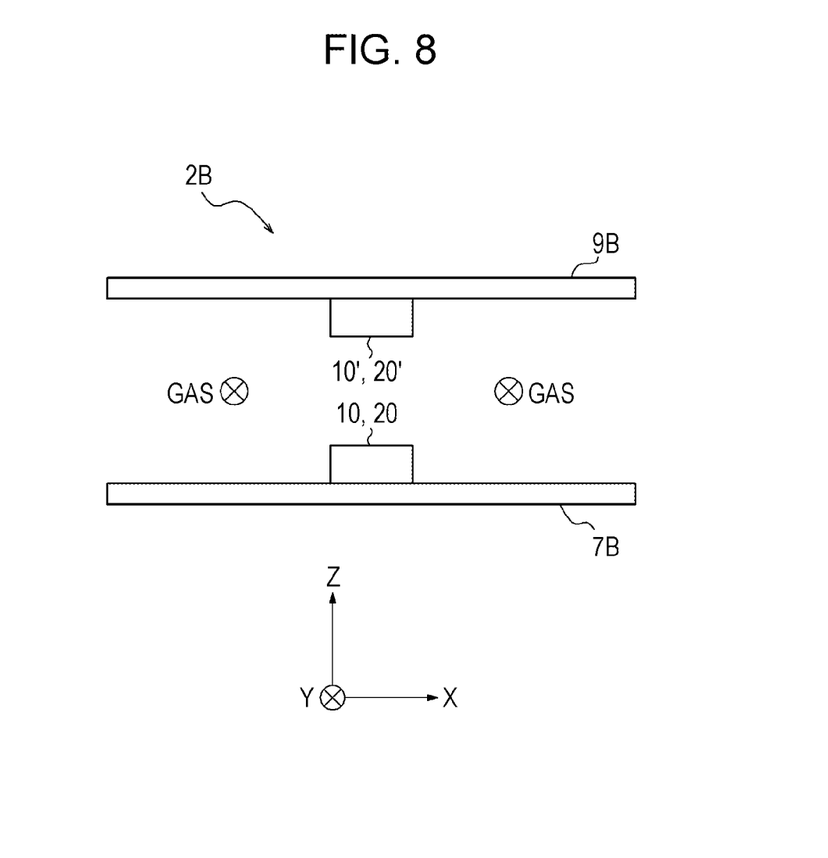
FIG. 8 is a schematic view illustrating a configuration of a gas detection device according to an embodiment.

FIG. 8 illustrates a state in which a gas flows from the front side toward the back side (in the positive direction of the Y-axis) also in a flow path (7B, 9B) of a gas detection device 2B. That is, in the flow path (7B, 9B) of the gas detection device 2B illustrated in FIG. 8, the front side may be upstream, and the back side may be downstream.

In the gas detection device 2B illustrated in FIG. 8, a plate-shaped member 7B may have a configuration similar to that of the plate-shaped member 7A illustrated in FIG. 7. In the gas detection device 2B illustrated in FIG. 8, a plate-shaped member 9B also may have a configuration similar to that of the plate-shaped member 7A illustrated in FIG. 7. As illustrated in FIG. 8, in the gas detection device 2B, surfaces of the plate-shaped member 7B and the plate-shaped member 9B, on which the gas sensor 10 and the gas sensor 20 are disposed, may face each other. The plate-shaped member 7B of the gas detection device 2B illustrated in FIG. 8 is equipped with the sensor array (10, 20) including the gas sensor 10 and the gas sensor 20. The plate-shaped member 9B of the gas detection device 2B illustrated in FIG. 8 is equipped with the sensor array (10', 20') including the gas sensor 10' and the gas sensor 20'.

Also with the gas detection device 2B illustrated in FIG. 8, it is possible to obtain advantageous effects that are similar to those of the gas detection device 2A.

FIG. 8 illustrates an example of a state in which the upper surfaces of the gas sensor 10 and the gas sensor 20, which are disposed on the plate-shaped member 7B, are separated from the lower surfaces of the gas sensor 10' and the gas sensor 20', which are disposed on the plate-shaped member 9B, in the gas detection device 2B. However, in the gas detection device 2B according to an embodiment, the upper surfaces of the gas sensor 10 and the gas sensor 20 may be in contact with or, for example, bonded to the lower surfaces of the gas sensor 10' and the gas sensor 20'. Also in this case, for example, a sufficiently wide gas flow path is formed, for example, on each of the right side or on the left side of the gas sensor 10 and the gas sensor 20. Accordingly, also with the gas detection device 2B, it is possible to obtain advantageous effects that are similar to those of the gas detection device 1A.

Figure 9:
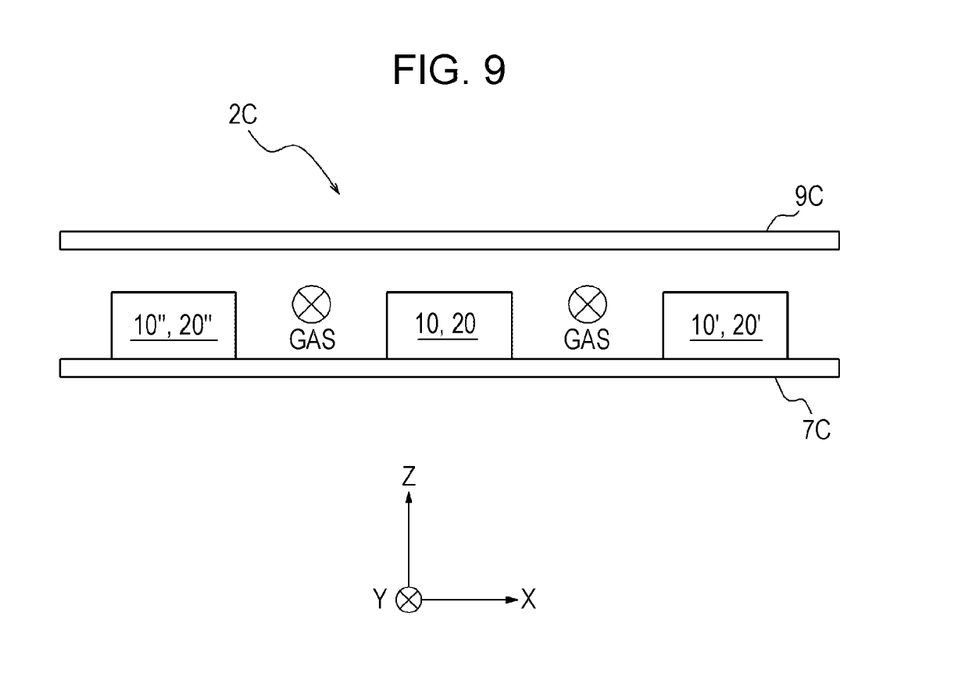
FIG. 9 is a schematic view illustrating a configuration of a gas detection device according to an embodiment.

FIG. 9 illustrates a modification of the gas detection device 2A illustrated in FIG. 7. The meanings of symbols in FIG. 9 are similar to those in FIG. 7.

The gas detection device 2A illustrated in FIG. 7 includes only one sensor array. In contrast, a gas detection device 2C illustrated in FIG. 9 may include three sensor arrays.

As illustrated in FIG. 9, a plate-shaped member 7C of the gas detection device 2C is equipped with the sensor array (10, 20), which includes the gas sensor 10 and the gas sensor 20, as with the plate-shaped member 7A illustrated in FIG. 7. As illustrated in FIG. 9, the plate-shaped member 7C of the gas detection device 2C is equipped with the sensor array (10', 20'), which includes the gas sensor 10' and the gas sensor 20'. Moreover, as illustrated in FIG. 9, the plate-shaped member 7C of the gas detection device 2C is equipped with the sensor array (10", 20"), which includes the gas sensor 10" and the gas sensor 20".

Also with such a configuration, as illustrated in FIG. 9, a sufficiently wide gas flow path is formed in at least one of a space between the sensor array (10, 20) and the sensor array (10', 20') and a space between the sensor array (10, 20) and the sensor array (10", 20"). Accordingly, also with the gas detection device 2C, it is possible to obtain advantageous effects similar to those of the gas detection device 1A and the like.

FIG. 9 illustrates an example in which the gas detection device 2C includes three sensor arrays. However, the gas detection device 2C according to an embodiment may include two sensor arrays or may include more than three sensor arrays.

FIG. 9 illustrates an example in which the upper surfaces of the sensor array (10, 20) and the like, which are disposed on the plate-shaped member 7C, are separated from a plate-shaped member 9C in the gas detection device 2C. However, in the gas detection device 2C according to an embodiment, the upper surfaces of the sensor array (10, 20) and the like, which are disposed on the plate-shaped member 7C, may be in contact with or, for example, bonded to the plate-shaped member 9C. Also in this case, a sufficiently wide gas flow path is formed in at least one of a space between the sensor array (10, 20) and the sensor array (10', 20') and a space between the sensor array (10, 20) and the sensor array (10", 20").

In the gas detection device 2C illustrated in FIG. 9, the plate-shaped member 9C may also have a configuration similar to that of the plate-shaped member 7C. That is, the gas detection device 2C illustrated in FIG. 9 may include the sensor array (10, 20) and the like also on the plate-shaped member 9C. In this case, in the gas detection device 2C, surfaces of the plate-shaped member 7C and the plate-shaped member 9C on which the sensor array (10, 20) and like are disposed may face each other. Moreover, in this case, the upper surfaces of the sensor array (10, 20) and the like, which are disposed on the plate-shaped member 7C, may be separated from, in contact with, or, for example, bonded to the lower surfaces of the sensor array (10, 20) and the like, which are disposed on the plate-shaped member 9C.

Figure 10:
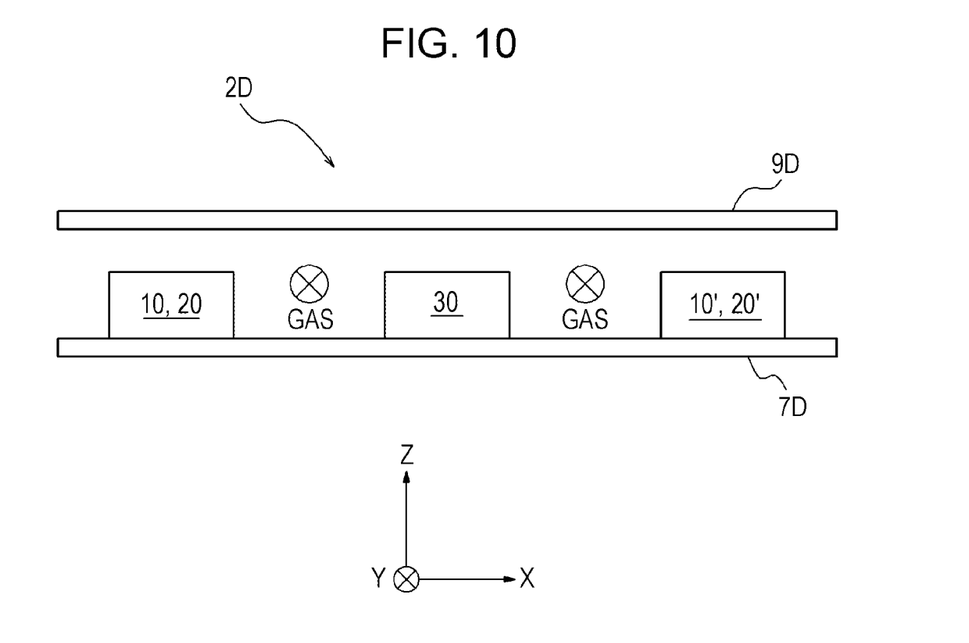
FIG. 10 is a schematic view illustrating a configuration of a gas detection device according to an embodiment.

FIG. 10 illustrates a modification of the gas detection device 2C illustrated in FIG. 9. The meanings of symbols in FIG. 10 are similar to those in FIG. 7.

A gas detection device 2D illustrated in FIG. 10 may include three sensor arrays as with the gas detection device 2C illustrated in FIG. 9. In the gas detection device 2D illustrated in FIG. 10, a sensor array that is different from that of the gas detection device 2C illustrated in FIG. 9 may be disposed.

As illustrated in FIG. 10, a plate-shaped member 7D of the gas detection device 2D includes the sensor array (10, 20), which includes the gas sensor 10 and the gas sensor 20. As illustrated in FIG. 10, the plate-shaped member 7D of the gas detection device 2D includes the sensor array (10', 20'), which includes the gas sensor 10' and the gas sensor 20'. Moreover, as illustrated in FIG. 10, the plate-shaped member 7D of the gas detection device 2D may include the sensor array 30 between the sensor array (10, 20) and the sensor array (10', 20').

The gas detection device 2D illustrated in FIG. 10 is based on a principle similar to that of the gas detection device 1D illustrated in FIG. 4. Accordingly, the sensor array 30 of the gas detection device 2D illustrated in FIG. 10 may have a configuration similar to that of the sensor array 30 of the gas detection device 1D illustrated in FIG. 4. That is, in the sensor array 30, for example, even a gas sensor that is disposed at the position of the gas sensor 10 illustrated in FIG. 1 (that is, a position on the upstream side) need not include a heater for heating a gas. Even if a gas sensor disposed in the sensor array 30 on the upstream side does not include a heater, the sensor array 30 is disposed so as to be interposed between the sensor array (10, 20) and the like. Accordingly, in the sensor array 30, for example, even when a gas sensor that does not include a heater is disposed at the position of the gas sensor 10 illustrated in FIG. 1, the gas sensor is disposed so as to be interposed between the gas sensors 10 each of which includes a heater. The sensor array 30 may include a gas sensor that is affected by temperature, such as the gas sensor 20.

With the configuration of the gas detection device 2D illustrated in FIG. 10, it is possible to obtain advantageous effects similar to those of the gas detection device 1D, based on a principle similar to that of FIG. 4. Also with the configuration of the gas detection device 2D illustrated in FIG. 10, a sufficiently wide gas flow path is formed in at least one of a space between the sensor array (10, 20) and the sensor array 30 and a space between the sensor array 30 and the sensor array (10', 20'). Accordingly, also with the gas detection device 2D, it is possible to obtain advantageous effects similar to those of the gas detection device 2C illustrated in FIG. 9 and the like.

FIG. 10 illustrates an example in which the gas detection device 2D includes three sensor arrays. However, the gas detection device 2D according to an embodiment may include two sensor arrays or may include more than three sensor arrays.

FIG. 10 illustrates an example in which the upper surfaces of the sensor array (10, 20) and the like, which are disposed on the plate-shaped member 7D, are separated from a plate-shaped member 9D in the gas detection device 2D. However, in the gas detection device 2D according to an embodiment, the upper surfaces of the sensor array (10, 20) and the like, which are disposed on the plate-shaped member 7A, may be in contact with or, for example, bonded to the plate-shaped member 9D. Also in this case, a sufficiently wide gas flow path is formed in at least one of a space between the sensor array 30 and the sensor array (10, 20) and a space between the sensor array 30 and the sensor array (10', 20').

In the gas detection device 2D illustrated in FIG. 10, the plate-shaped member 9D may also have a configuration similar to that of the plate-shaped member 7D. That is, the gas detection device 2D illustrated in FIG. 10 may include the sensor array (10, 20) and/or the sensor array 30 and the like also on the plate-shaped member 9D. In this case, in the gas detection device 2D, surfaces of the plate-shaped member 7D and the plate-shaped member 9D on which the sensor array (10, 20) and like are disposed may face each other. Moreover, in this case, the upper surfaces of the sensor array (10, 20) and the like, which are disposed on the plate-shaped member 7D, may be separated from, in contact with, or, for example, bonded to the lower surfaces of the sensor array (10, 20) and the like, which are disposed on the plate-shaped member 9D.

Figure 11:
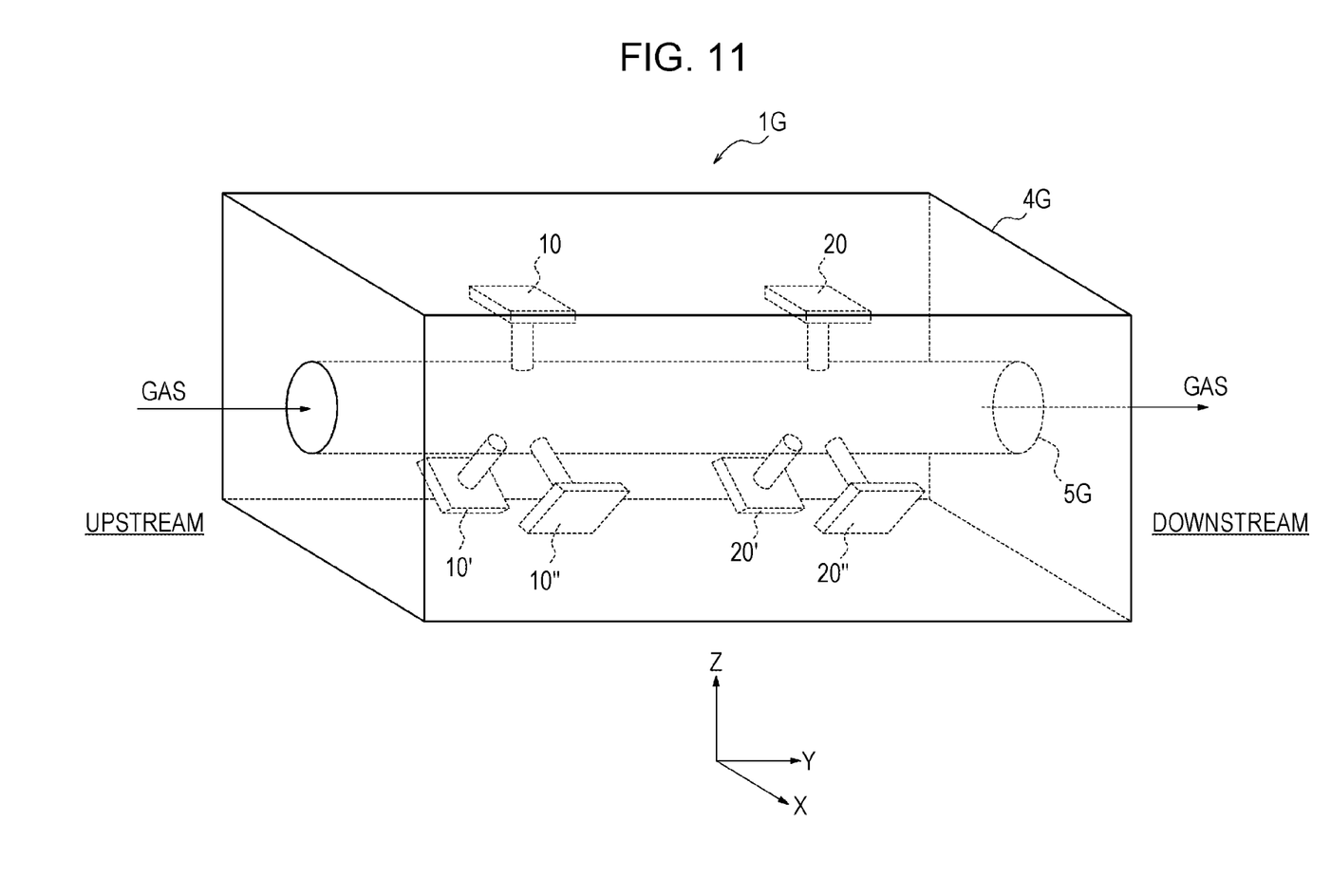
FIG. 11 is a schematic view illustrating a configuration of a gas detection device according to an embodiment.
Figure 12:
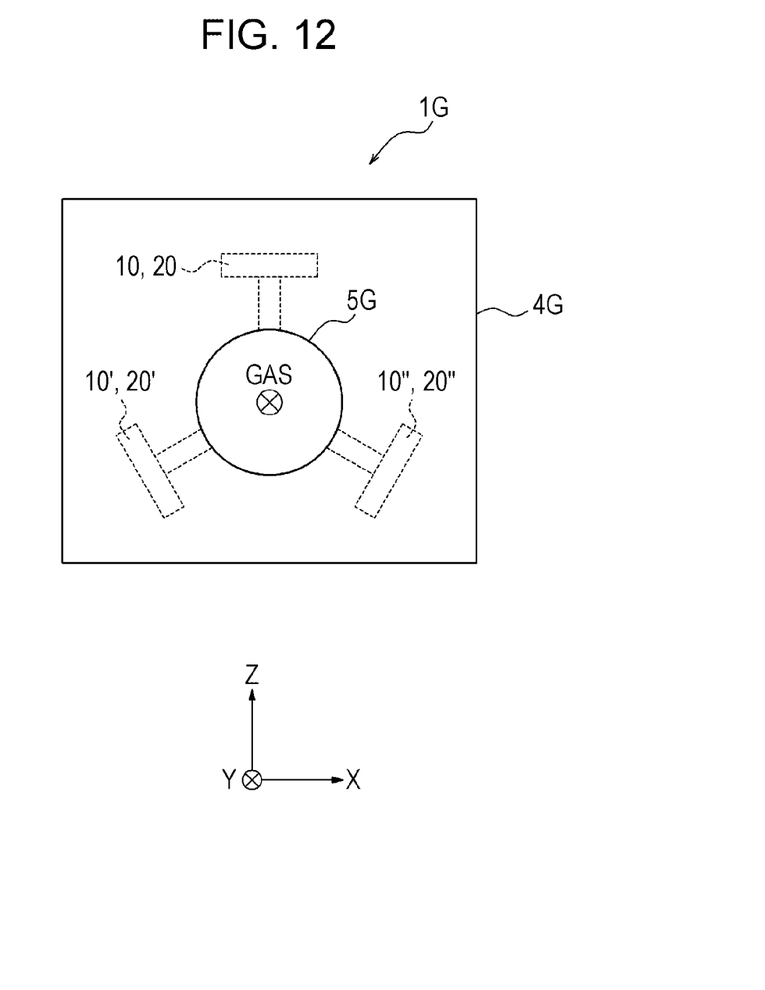
FIG. 12 is a schematic view illustrating a configuration of a gas detection device according to an embodiment.

As illustrated in FIGS. 11 and 12, a gas detection device 1G may accommodate, in an accommodation chamber 4G that covers a flow path 5G for a gas, the flow path 5G, at least one first-type gas sensor (10, 10', 10"), and at least one second-type gas sensor (20, 20', 20"). That is, in the gas detection device 1G according to an embodiment, a plurality of gas sensors may be disposed around the flow path 5G to allow a gas to flow into each of the gas sensors so that the gas can be detected. In the detection device 1G, the first-type gas sensor (10, 10', 10") may be disposed upstream of the second-type gas sensor (20, 20', 20") in the flow path 5G. With such a configuration, it is possible to reduce the size of the gas detection device and to reduce the amount of gas.

Heretofore, the present disclosure has been described based on the drawings and embodiments. Note that it is easy a person having ordinary skill in the art to conceive of various modifications or corrections based on the present disclosure. Accordingly, note that these modifications and corrections are included in the scope of the present disclosure. For example, functions and the like included in each functional unit may be rearranged unless logically contradictory. A plurality of functional units and the like may be combined into one or may be divided. Each embodiment according to the present disclosure described above need not be carried out faithfully to each embodiment described above but can be carried out by appropriately combining the features or by omitting some of the features.

REFERENCE SIGNS LIST 1, 2 gas detection device
5 tubular member that forms flow path
4G accommodation chamber
7, 9 plate-shaped member that forms flow path
10 first-type gas sensors
12 heater
20 second-type gas sensor
30 gas sensor (sensor array)

The invention claimed is:

1. A gas detection device comprising:
a flow path including an inlet and an outlet in which a gas flows in a predetermined direction;
one or more pumps, which are located at the inlet and/or the outlet of the flow path, that force gas flow;
at least one first-type gas sensor that includes a heater for heating the gas; and
at least one second-type gas sensor that does not include a heater for heating the gas,
wherein the first-type gas sensor is positioned upstream of the second-type gas sensor in the flow path.

2. The gas detection device according to claim 1, wherein at least one of the first-type gas sensor and the second-type gas sensor includes a plurality of gas sensors.

3. The gas detection device according to claim 1, wherein the second-type gas sensor includes a gas sensor that is affected by temperature.

4. The gas detection device according to claim 1, wherein, in the first-type gas sensor, one of the heaters is shared by a plurality of gas sensors.

5. The gas detection device according to claim 1, comprising a sensor array in which the first-type gas sensor and the second-type gas sensor are arranged in a row in the flow path.

6. The gas detection device according to claim 5, comprising:
a plurality of the sensor arrays,
wherein at least one of the second-type gas sensors is disposed between two of the plurality of sensor arrays.

7. The gas detection device according to claim 5, comprising:
a plurality of the sensor arrays,
wherein at least one gas sensor that is affected by temperature is disposed between two of the plurality of sensor arrays.

8. The gas detection device according to claim 1, wherein the flow path has a tubular shape.

9. The gas detection device according to claim 1, wherein the flow path is formed between two surfaces that face each other.

10. The gas detection device according to claim 1, wherein the first-type gas sensor and the second-type gas sensor are positioned around the flow path.

11. The gas detection device according to claim 1, wherein the first-type gas sensor is disposed substantially on the same height as the height of the second-type gas sensor.

12. The gas detection device according to claim 11, wherein the first-type gas sensor and the second-type gas sensor are circumferentially spaced with respect to each other along the flow path.

13. The gas detection device according to claim 12, further including a tubular member including an interior surface that defines the flow path, and the first-type gas sensor and the second-type gas sensor are circumferentially spaced with respect to each other along the flow path on the interior surface of the tubular member.

14. The gas detection device according to claim 12, further including an interior surface that defines the flow path, and the first-type gas sensor and the second-type gas sensor are circumferentially spaced with respect to each other along the flow path and outside of the flow path.

* * * * *